Aug. 11, 1970 M. WILLIAMS ET AL 3,524,123

VOLTAGE REGULATOR EMPLOYING TRIACS AND DIODES IN A FULL WAVE RECTIFIER

Filed March 27, 1969

INVENTOR
Malcolm Williams & Duncan Barry Hodgson

BY Holman, Glascock, Downing & Seebold
ATTORNEYS

United States Patent Office 3,524,123
Patented Aug. 11, 1970

3,524,123

VOLTAGE REGULATOR EMPLOYING TRIACS AND DIODES IN A FULL WAVE RECTIFIER

Malcolm Williams, Solihull, and Duncan Barry Hodgson, Whitnash, Leamington Spa, England, assignors to Joseph Lucas (Industries) Limited, Birmingham, England, a British company Filed Mar. 27, 1969, Ser. No. 811,097
Claims priority, application Great Britain, Apr. 1, 1968 15,508/68
Int. Cl. H02p *9/00*
U.S. Cl. 322—28 2 Claims

ABSTRACT OF THE DISCLOSURE

In an electrical supply system using a permanent magnet alternator to supply power to a pair of supply lines through a full wave rectifier, one set of diodes in the full wave rectifier is replaced by triacs, which are devices similar to thyristors except that they can be turned on by positive or negative pulses at the gate, and can conduct current in either direction. The gates of the triacs are coupled to the alternator so that in normal use voltage is induced by the alternator to turn the trics on and cause them to act as diodes. When the voltage between the supply lines reaches a predetermined value, a further circuit supplies gate current to all the triacs so that no power is supplied by the alternator.

This invention relates to electrical supply systems, in particular for road vehicles.

The invention makes use of a semiconductor device known as a triac. This device is similar to a thyristor in that it can be turned on by a positive pulse at its gate, and then will continue to conduct until the anode-cathode current is reduced to zero. In addition, however, it can also be turned on by a negative pulse at its gate. Moreover, unlike the thyristor which passes current in one direction only, the triac can pass current in either direction after being turned on by a positive or negative pulse at its gate.

An electrical supply system according to the invention comprises in combination a pair of supply lines, the voltage between which is to be maintained substantially constant, a permanent magnet alternator supplying power to said lines through a full wave rectifier which comprises a set of diodes connecting the alternator to one supply line and a set of triacs connecting the alternator to the other supply line, means coupling the gates of the triacs to the alternator so that in use voltages developed by the alternator turn the triacs on in turn so that they effectively act as diodes, and voltage sensing means connected between the supply lines and operable to supply gate current to all the tricas when the voltage between the supply lines exceeds a predetermined value.

Figure 1:
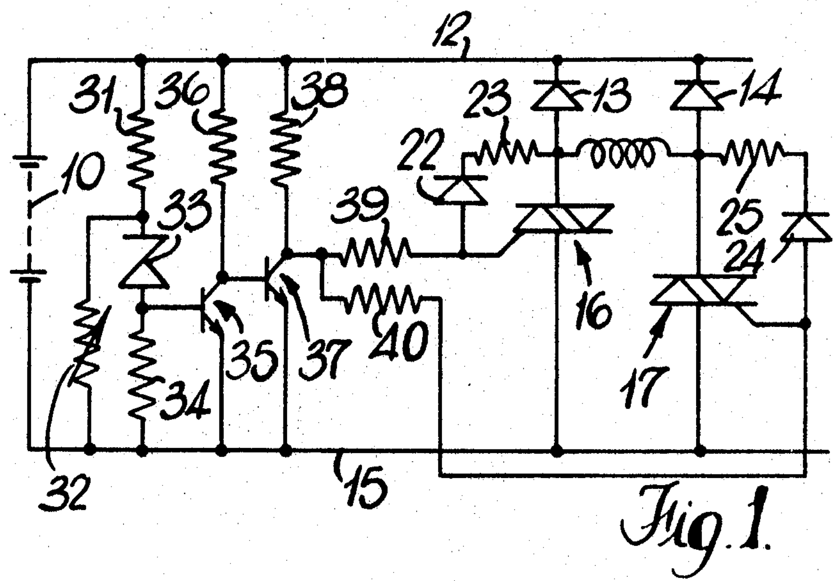
Figure 2:
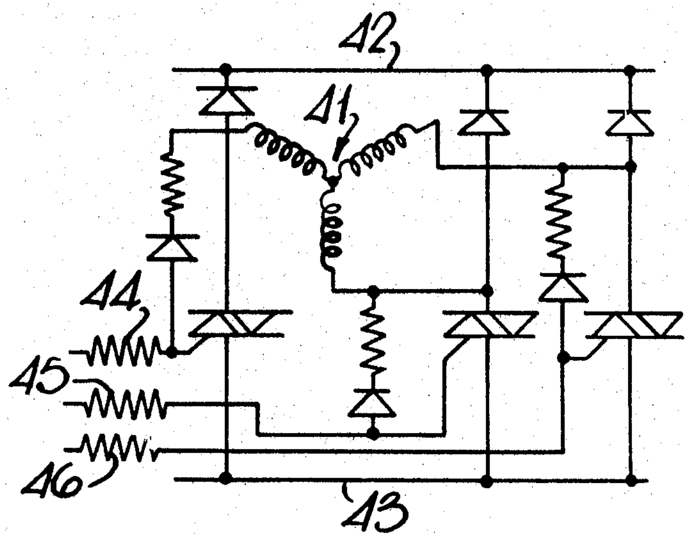

In the accompanying drawings,

FIG. 1 and 2 are circuit diagrams illustrating two examples of the invention.

Referring to FIG. 1, a single phase permanent magnet alternator includes a winding 11 supplying power to a positive line 12 through a pair of diodes 13, 14 and to a negative line 15 through a pair of triacs 16, 17. The battery 10 of a road vehicle is connected between the lines 12, 15 so as to be charged by the alternator. The gate of the triac 16 is connected through a diode 22 and a resistor

23 in series to the junction of the triac 16 and diode 13, whilst the gate of the triac 17 is connected through a diode 24 and resistor 25 in series to the junction of the diode 14 and triac 17.

Connected in series between the lines 12, 15 are a resistor 31 and a variable resistor 32, the resistor 32 being bridged by a Zener diode 33 and resistor 34 in series. The junction of the Zener diode 33 and resistor 34 is connected to a n-p-n transistor 35 having its emitter connected to the line 15 and its collector connected through a resistor 36 to the line 12. The collector of the transistor 35 is also connected to the base of an n-p-n transistor 37, the emitter of which is connected to the line 15 and the collector of which is connected through a resistor 38 to the line 12. The collector of the transistor 37 is connected through resistors 39, 41 respectively to the gates of the triacs 16 and 17.

In operation, as long as the voltage of the battery 10 is below a predetermined value, which is set by the resistor 32, the Zener diode 33 is nonconductive, and there is no flow of base current in the transistor 35. Current flowing through the resistor 36 turns on the transistor 37, so that current flowing through resistor 38 can flow through the collector and emitter of transistor 37, and there is no current flow through resistors 39 and 41.

It is found in practice that when a system of the form shown is first energised one of the triacs 16 and 17 will conduct. Assuming that the triac 16 is conducting, then the current flow is by way of the triac 16 and the diode 14. When the current reduces to zero at the end of a half-cycle, the voltage in the winding 11 starts to reverse and in so doing forward biases the diode 13 and causes the junction of the diode 14 and the triac 17 to fall below the negative potential of the battery, so that current flows through the resistor 25 and diode 24 to turn the triac 17 on. During the next half-cycle the triac 17 and the diode 13 conduct, and at the end of the half-cycle of current the induced E.M.F. in the winding 11 causes current to flow through the resistor 23 and diode 22 to turn the triac 16 on. This operation continues as long as the voltage is below a predetermined value. When the battery voltage reaches the predetermined value, the Zener diode 33 conducts, and turns off the transistor 37 so that gate current is provided for both triacs 16, 17 by way of the resistors 39, 40. As a result, both triacs conduct simultaneously and short-circuit the winding 11, so that no output is obtained from the alternator. When the voltage falls below the predetermined value, the Zener diode turns off and the transistor 37 conducts so that no further current flows through the resistors 39 and 40. At this stage both triacs 16 and 17 will be conducting, but as soon as the current flowing through one triac falls to zero, that triac turns off, whereafter the induced E.M.F. developed in the winding 11 turns the triacs on in turn as described above.

The invention can of course also be applied to a multiphase system, a suitable arrangement for this purpose is shown in FIG. 2. A three phase permanent magnet alternator 41 provides power to a positive supply line 42 through three diodes and to a negative supply line 43 through three triacs. The gate of each triac is connected through a series circuit including a diode and a resistor to the junction of the triac and its associated diode, and the gates of the three triacs are further connected through three resistors 44, 45, 46 to the collector of the transistor 37 shown in FIG. 1. The operation is exactly the same as FIG. 1.

Having thus described our invention what we claim as new and desire to secure by Letters Patent is:

1. An electrical supply system comprising in combination a pair of supply lines the voltage between which is to be maintained substantially constant, a permanent magnet alternator supplying power to said lines through a full wave rectifier which comprises a set of diodes connecting the alternator to one supply line and a set of triacs connecting the alternator to the other supply line, means coupling the gates of the triacs to the alternator so that in use voltages developed by the alternator turn the triacs on in turn so that they effectively act as diodes, and voltage sensing means connected between the supply lines and operable to supply gate current to all the triacs when the voltage between the supply lines exceeds a predetermined value.

2. A system as claimed in claim 1 in which the alternator has a plurality of output terminals each of which is connected to said one supply line through a diode and to said other supply line through a triac, said means coupling the gates of the triacs to the alternator comprising a plurality of circuits, each containing a diode, connecting each of said terminals to the gate of the triac which is connected to that terminal.

References Cited

UNITED STATES PATENTS

| | | | |
|---|---|---|---|
| 3,260,917 | 7/1966 | Shimwell et al. | 320—39 X |
| 3,341,763 | 9/1967 | Noddin | 322—91 X |
| 3,379,957 | 4/1968 | Gugliemi | 322—28 X |
| 3,427,529 | 2/1969 | Cummins et al. | 322—28 X |

J. D. MILLER, Primary Examiner

G. GOLDBERG, Assistant Examiner

U.S. Cl. X.R.

317—16, 31, 33; 320—40, 59, 71; 321—18; 322—91